(12) United States Patent
Rymer et al.

(10) Patent No.: US 7,687,560 B2
(45) Date of Patent: *Mar. 30, 2010

(54) LOW-COLOR PVB SHEET AND A PROCESS FOR MAKING SAME

(75) Inventors: Donald L. Rymer, Little Hocking, OH (US); Nolan K. Read, III, Vienna, WV (US)

(73) Assignee: E.I. du Pont de Nemours and Company, Wilmington, DE (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/501,598

(22) PCT Filed: Mar. 11, 2003

(86) PCT No.: PCT/US03/07354

§ 371 (c)(1),
(2), (4) Date: Jul. 13, 2004

(87) PCT Pub. No.: WO2004/018378

PCT Pub. Date: Mar. 4, 2004

(65) Prior Publication Data

US 2005/0019536 A1 Jan. 27, 2005

Related U.S. Application Data

(60) Provisional application No. 60/363,943, filed on Mar. 12, 2002.

(51) Int. Cl.
*C08F 236/12* (2006.01)
*C08K 5/00* (2006.01)
*C08L 29/04* (2006.01)
*B01J 13/00* (2006.01)
*C08F 2/24* (2006.01)
*B32B 27/32* (2006.01)
*B32B 27/42* (2006.01)

(52) U.S. Cl. ............... 524/297; 524/308; 524/503; 524/557; 524/747; 428/220; 428/437

(58) Field of Classification Search ............ 524/297, 524/308, 503, 557, 747; 428/220, 437
See application file for complete search history.

(56) References Cited

U.S. PATENT DOCUMENTS

| | | | |
|---|---|---|---|
| 3,153,009 A | 10/1964 | Rombach | |
| 4,035,549 A | 7/1977 | Kennar | |
| 4,696,971 A * | 9/1987 | Degeilh | 525/61 |
| 4,937,147 A | 6/1990 | Cartier et al. | |
| 5,013,779 A | 5/1991 | Fariss et al. | |
| 5,187,217 A | 2/1993 | Degeilh et al. | |
| 5,322,875 A | 6/1994 | Dages | |
| 5,573,842 A * | 11/1996 | Gutweiler | 428/220 |
| 5,766,755 A | 6/1998 | Chaussade et al. | |
| 5,886,075 A | 3/1999 | Keane et al. | |
| 6,383,647 B1 | 5/2002 | Shohi et al. | |
| 6,586,103 B2 | 7/2003 | Shohi et al. | |
| 6,673,456 B1 | 1/2004 | Kobata et al. | |
| 2002/0136906 A1 | 9/2002 | Schohi et al. | |
| 2002/0182422 A1 | 12/2002 | Garrett et al. | |
| 2005/0131133 A1 | 6/2005 | Wong et al. | |
| 2005/0192398 A1 | 9/2005 | Wong et al. | |

FOREIGN PATENT DOCUMENTS

| | | |
|---|---|---|
| EP | 0102502 A1 | 3/1984 |
| EP | 0185796 A1 | 7/1986 |
| EP | 1036775 A1 * | 9/2000 |
| FR | 2401941 * | 2/1979 |
| GB | 2 007 677 A | 5/1979 |
| JP | 05-051505 | 3/1993 |
| JP | 08-337446 * | 12/1996 |
| JP | 11-349769 | 12/1999 |
| WO | WO 99/61243 | 12/1999 |
| WO | WO 03/078160 A1 | 9/2003 |
| WO | WO 03/078521 A1 | 9/2003 |

OTHER PUBLICATIONS

On line Produdt Catalog, Great Lakes Chemical Co. 3rd Edition, 2001, www.pa.greatlakes.com.*
PCT International Preliminary Examination Report for International application No. PCT/US03/07354, dated Aug. 16, 2004.
PCT International Search Report for International applicationNo. PCT/US03/07354, dated Apr. 20, 2004.
U.S. Appl. No. 11/343,591, filed Jan. 30, 2006.
Abstract for EP 0 102 502.

* cited by examiner

*Primary Examiner*—William K Cheung
(74) *Attorney, Agent, or Firm*—Kevin Dobson; Mark Kuller

(57) ABSTRACT

The present invention is a low-color plasticized PVB sheet and a process for preparing the same. The sheet of the present invention yields a YID measurement of less than 12. A sheet of the present invention is useful for making glass laminates that are useful in cars, boats, trains, buildings, and display cases, for example.

49 Claims, No Drawings

LOW-COLOR PVB SHEET AND A PROCESS FOR MAKING SAME

This application claims the benefit of U.S. Provisional Application No. 60/363,943, filed Mar. 12, 2002.

BACKGROUND OF THE INVENTION

Plasticized polyvinyl butyral (PVB) sheet is used in the manufacture of laminate structures such as, for example: windshields for vehicles including automobiles, motorcycles, boats and airplanes; homes and buildings; shelving in cabinets and display cases; and other articles where structural strength is desirable in a glass sheet. In many applications, it is desirable that the laminate be transparent and colorless, or at least have very low color. Undesired or unintended color in a glass laminate can be a result of impurities from various sources. In some cases, color can occur in the PVB interlayer. Color in a PVB sheet can result from several sources in the PVB resin, or from the manufacturing process. For example, color can result from instability of the PVB resin, from impurities, or from other additives present in the PVB composition. Color in a PVB sheet can develop during storage of the PVB, or be caused by process conditions to which the resin is subjected.

Conventional PVB sheet typically includes a plasticizer in order to increase the flexibility and processibility of the PVB sheet. Generally, the higher the concentration of plasticizer, the more flexible the sheet. Various plasticizers are conventional in the manufacture of PVB, and include such plasticizers as: diesters of polyethylene glycols such as triethylene glycol di(2-ethylhexanoate) (3GO) and tetraethylene glycol diheptanoate (4G7), for example. These examples are not all-inclusive of known plasticizers useful for preparing PVB sheeting. Typically, plasticizer is included in amounts of greater than 30 parts per hundred (pph), based on the total weight of the resin. Depending upon the application, as well as other factors, highly plasticized PVB typically can have as much as 60 pph of plasticizer.

In a conventional PVB sheet manufacturing process, additives are typically included to protect PVB from developing color, to improve the manufacturing process, or to impart desirable properties or characteristics to the sheet. Examples of such additives are: antioxidants, such as octyl phenol for example; light stabilizers; surfactants; and adhesion control additives.

Manufacturers are continually looking for opportunities to improve the process or the properties of the product. For example, combinations of light stabilizers can be required for optimum performance in conventional PVB compositions. Conventional PVB sheet compositions can include, for example, Tinuvin® P, Tinuvin® 123 in addition to Tinuvin® 326 to obtain satisfactory light stability in the sheet. However, using combinations of light stabilizers can add additional expense and complexity to the manufacturing process, which is not desirable.

One other problem faced by PVB manufacturers is that changing one component or additive in the polymer recipe can affect the performance of other additives, or change the quality or performance of the final sheet. There can be totally unexpected problems or benefits that result from a change in the composition of a polymer recipe. For example, Applicants have discovered that the effectiveness of a particular antioxidant can be dependent upon the plasticizer used. For example, the Applicants surprisingly have found that antioxidants that are effective in combination with 4G7 as plasticizer are not as effective when using 3GO plasticizer.

It can be desirable to have a process for preparing a plasticized PVB sheet composition, whereby the color of the PVB sheet can be improved with the proper selection of additives. It is a further object of the present invention to have a process for manufacturing PVB that utilizes a plasticizer and a compatible antioxidant/additive package.

SUMMARY OF THE INVENTION

In one aspect, the present invention is a plasticized PVB sheet composition consisting essentially of: polyvinylbutyral having a hydroxyl (OH) number of from about 15 to about 20; a plasticizer or plasticizer mixture present in an amount of from about 30 parts per hundred (pph) to about 50 pph, based on the dry weight of the PVB resin; a surfactant; and optionally including either (i) a PVB bleaching compound, or (ii) an antioxidant and an ultraviolet (UV) light stabilizer, or (iii) both (i) and (ii), wherein the sheet has a yellowness index (YID) color of less than 12.

In another aspect the present invention is a process for preparing a low color, PVB sheet comprising the steps: (I) admixing polyvinyl alcohol, butyraldehyde, an acid or mixture of acids, water, and a surfactant (II) stabilizing the mixture obtained in step (I) by (a) raising the pH of the mixture to at least pH 10 (b) isolating the resin by draining the liquid, (c) washing the resin with neutral pH water; (III) plasticizing the PVB resin composition with from about 30 to about 50 pph of plasticizer based on the dry weight of the PVB resin; (IV) optionally mixing (a) a PVB bleaching compound and/or (b) an antioxidant and a UV light stabilizer with the PVB resin composition; and (V) extruding the PVB resin composition at a temperature of from about 175° C. to about 225° C. to obtain a PVB sheet having a glass transition temperature ($T_g$) of greater than about 32° C. and a YID of less than about 12.

In still another aspect, the present invention is a laminate article comprising at least one layer of plasticized PVB sheet, wherein the PVB sheet consists essentially of: polyvinylbutyral having a hydroxyl (OH) number of from about 15 to about 20; a plasticizer or plasticizer mixture present in an amount of from about 30 parts per hundred (pph) to about 50 pph, based on the dry weight of the PVB resin; a surfactant; and optionally including either (i) a PVB bleaching compound, or (ii) an antioxidant and an ultraviolet (UV) light stabilizer, or (iii) both (i) and (ii), wherein the sheet has a yellowness index (YID) color of less than 12.

DETAILED DESCRIPTION

In one embodiment, the present invention is a plasticized PVB sheet composition comprising from about 30 to about 50 pph of a plasticizer. PVB can be manufactured according to known processes. For example, U.S. Pat. No. 3,153,009 describes a process for commercial manufacture of PVB. U.S. Pat. No. 4,696,971 also describes a process for manufacturing PVB wherein sodium dioctyl sulfosuccinate (DOSS) is used as a surfactant.

The term flake, as used in the present invention, describes a particular physical form of PVB resin material, that is, granular or particulate versus a film or a sheet. The physical form of the resin does not necessarily indicate a different PVB composition within the present application, even though sheets and/or films may include additives not found in the resin flake.

A PVB of the present invention includes a plasticizer. Plasticizers of the present invention can chosen from any that are known or used conventionally in the manufacture of plasticized PVB sheeting compositions. For example, a plasticizer suitable for use herein can be a plasticizer or a mixture of plasticizers selected from the group consisting of: diesters obtained from the chemical reaction of aliphatic diols with carboxylic acids, including diesters of polyether diols or polyether polyols; and, esters obtained from polyvalent carboxylic acids and aliphatic alcohols. For convenience, when describing the sheet compositions of the present invention, a mixture of plasticizers can be referred to herein as "plasticizer". That is, the singular form of the word "plasticizer" as used herein can represent the use of either one plasticizer or the use of a mixture of two or more plasticizers in a given sheet composition. The intended use will be apparent to a reader skilled in the art. Preferred plasticizers for use herein are diesters obtained by the reaction of triethylene glycol or tetraethylene glycol with aliphatic carboxylic acids having from 6 to 10 carbon atoms; and diesters obtained from the reaction of sebacic acid with aliphatic alcohols having from 1 to 18 carbon atoms. More preferably the plasticizer is either 4G7, 3GO or dibutyl sebacate (DBS). Most preferably the plasticizer is 3GO.

The composition of the present invention optionally includes at least one PVB bleaching compound. A PVB bleaching compound (bleaching compound) of the present invention is any compound that can reduce or eliminate color from a PVB sheet relative to the color of an otherwise identical composition, treated using an identical or similar process, with the exception that a bleaching compound is not present. The mode of the bleaching action demonstrated by the bleaching compound is not critical to the present invention. For example, a bleaching compound useful in the practice of the present invention can be a compound that reacts directly with color-forming compounds (color bodies) present in a PVB sheet composition, or a compound that is capable of yielding a compound that reacts directly with color-bodies. A bleaching compound can be a compound that can decompose in situ to yield decomposition products capable of reacting with color bodies present in a PVB sheet composition. A bleaching compound in the practice of the present invention can be a compound that inhibits the formation of color bodies. Bleaching compounds of the present invention include, for example, inorganic bisulfites such as sodium or potassium bisulfite; organic bisulfites such as tetramethylammonium bisulfite; and compounds similar in structure or function. Bleaching compounds also include sulfosuccinates such as dialkyl sulfosuccinates. For example, the present invention can include DOSS as a bleaching compound.

A bleaching compound of the present invention can be included in any effective finite amount. An effective amount for the purposes of the present invention is any amount that reduces the color of a PVB sheet relative to the color of an identical or substantially similar PVB sheet composition without the bleaching compound. Color measurement can be done according to any conventional standard practice. Alternatively, in the absence of comparative data, an effective amount is any amount that reduces the color of a PVB sheet to a yellowness index (YID) of less than about 12 YID. Preferably the YID is less than about 10, more preferably less than about 8, and most preferably less than about 6.

A bleaching compound can be included in an amount of from about 0.01 to about 0.85 pph, based on the weight of polyvinyl alcohol (PVA) used in the preparation of PVB. Preferably, the bleaching compound is present in an amount of from about 0.05 to about 0.80 pph, more preferably in an amount of from about 0.10 to about 0.75 pph, and most preferably in an amount of from about 0.15 to about 0.70 pph. While color reduction in a PVB sheet is an important consideration, the amount of bleaching compound included will also be a function of the cost of production and the other properties that may be affected by including the additive.

The present invention includes a surfactant. A surfactant suitable for use herein can be any that is known to be useful in the art of polyvinylbutyral manufacture. For example, surfactants suitable for use herein include: sodium lauryl sulfate; ammonium lauryl sulfate; sodium dioctyl sulfosuccinate; ammonium perfluorocarboxylates having from 6 to 12 carbon atoms; sodium aryl sulfonates, adducts of chlorinated cyclopentadiene and maleic anhydride; partially neutralized polymethacrylic acid; alkylaryl sulfonates; sodium N-oleyl-N-methyl taurate; sodium alkylaryl polyether sulfonates; triethanolamine lauryl sulfate; diethyl dicyclohexyl ammonium lauryl sulfate; sodium secondary-alkyl sulfates; sulfated fatty acid esters; sulfated aryl alcohols; and the like. Preferable surfactants include sodium lauryl sulfate, sodium dioctyl sulfosuccinate, sodium cocomethyl tauride, and decyl (sulfophenoxy)benzenesulfonic acid disodium salt.

The surfactant can be included in any effective amount for the particular set of process conditions practiced. The surfactant can be included in an amount of from about 0.01 to about 0.85 pph by weight, based on the weight of PVA used to prepare PVB. Preferably the surfactant is included in an amount of from about 0.10 to about 0.80 pph. More preferably, the surfactant is included in an amount of from about 0.15 to about 0.75 pph. Most preferably, the surfactant is included in an amount of from about 0.15 to about 0.70 pph.

The surfactant and the bleaching compound can be the same compound, or can perform both functions. The bleaching compound is optional only in the event that the surfactant can also perform the function of a bleaching compound. Otherwise the bleaching compound is considered to be essential in the practice of the present invention. For example, DOSS can be used in the practice of the present invention as a surfactant. DOSS can also be a bleaching compound in the practice of the present invention. In one particularly preferred embodiment, DOSS can be included as both a surfactant and as a bleaching compound. In this embodiment, the use of a bleaching compound other than DOSS is optional.

Antioxidants can be optionally included in a PVB resin composition of the present invention during sheet preparation to inhibit the oxidation of the PVB resin and/or components. Preferred antioxidants are known conventionally and available commercially. Most preferred are bis-phenolic antioxidants, which are surprisingly more suitable for preparing low color PVB sheeting, particularly when 3GO is used as plasticizer. Bis-phenolic antioxidants are available and can be obtained commercially. Suitable bis-phenolic antioxidants include 2,2'-ethylidenebis(4,6-di-t-butylphenol); 4,4'-butylidenebis(2-t-butyl-5-methylphenol); 2,2'-isobutylidenebis(4,6-dimethylphenol); and 2,2'-methylenebis(6-t-butyl-4-methylphenol), for example. Bis-phenolic anti-oxidants are commercially available under the tradename of ANOX™ 29, LOWINOX® 22M46, LOWINOX® 44B25, and LOWINOX® 22IB46, for example.

An antioxidant can be included in any effective finite amount. Preferably, the antioxidant is included in an amount of from about 0.01 to about 0.6%, based on the total weight of the sheet. More preferably, the antioxidant is present in amount of from about 0.03 to about 0.3%, most preferably in an amount of from about 0.05 to about 0.25%.

Other additives are known conventionally to be useful, and can be included in a resin composition of the present invention. Such additives include: light stabilizers, particularly UV light stabilizers, such as Tinuvin® P; Tinuvin® 326, and Tinuvin® 123. UV light stabilizers can stabilize the PVB composition by absorbing ultraviolet light and preventing unwanted effects by the UV light on the PVB. Adhesion control agents such as alkali and alkaline earth metal salts of carboxylic acids, alkaline earth metal salts of inorganic acids, or a combination of such salts can be added. Surface tension controlling agents such as Trans® 290 or Trans® 296 available from Trans-Chemco; or Q2-3183A® available from Dow Chemical can be used in the practice of the present invention. The use of Trans® 290 or Trans® 296 is preferred.

A PVB resin of the present invention can be obtained by processes known in the art of PVB manufacture. PVB resins used in the practice of the present invention can be prepared by mixing PVA with butyraldehyde in an aqueous medium in the presence of an acid or mixture of acids, at a temperature of from 5° C. to 100° C.

Typically, the ratio of PVA to butyraldehyde can be chosen such that the PVB has residual hydroxyl functionality, conventionally reported as OH number. Residual hydroxyl functionality can vary according to what properties are desirable in the PVB. The relative amounts of butyraldehyde and PVA required to obtain the desired OH number in the PVB resin will be readily apparent to those skilled in the art of PVB manufacture. In the practice of the present invention residual hydroxyl can be in the range of from about 14 to about 30. Preferably, the OH number is from about 15 to about 25. More preferably, the OH number is from about 15 to about 20, and most preferred in the practice of the present invention is PVB resin having an OH number in the range of from about 17 to about 19. The OH number can be determined according to standard methods such as ASTM D1396-92.

In a preferred embodiment, a low color PVB resin of the present invention can be obtained by a process comprising the steps: (I) admixing polyvinyl alcohol, butyraldehyde, an acid or mixture of acids, water, and a surfactant (II) stabilizing the mixture obtained in step (I) by (a) raising the pH of the mixture to at least pH 10 (b) isolating the resin by draining the liquid, (c) washing the resin with neutral pH water; (III) plasticizing the PVB resin composition with from about 30 to about 50 pph of plasticizer based on the dry weight of the PVB resin; (IV) optionally mixing (a) a PVB bleaching compound and/or (b) an antioxidant and a UV light stabilizer with the PVB resin composition; and (V) extruding the PVB resin composition at a temperature of from about 175° C. to about 225° C. to obtain a PVB sheet having a $T_g$ of greater than about 32° C. and a YID of less than about 12.

The steps of the process described herein can be carried out in varied order. For example, while it can be necessary to carry out step (I) before step (II) it is not essential, for the purpose of obtaining a low color sheet of the present invention, that steps (III) or (IV) be carried out in any particular order. Although it may be preferable to implement these steps just prior to, or simultaneous with, step (V). Also, the order of addition of components is not critical in the practice of the present invention, although a skilled artisan will recognize that there may be other benefits of carrying out the process in a consistent and ordered manner. For example, plasticizer can be mixed with the PVB either before or during the extrusion of the PVB composition, as described in U.S. Pat. No. 5,886,075.

Plasticizer can be added in any amount desirable to obtain a plasticized PVB sheet. Plasticizer can be added in an amount of from about 30 to about 50 pph, based upon the total dry weight of the resin. The "dry weight" as used herein refers to the weight of the dry resin, that is, after water has been removed from the resin. Preferably the plasticizer is present in an amount of from about 30 to about 45 pph, and most preferably in an amount of from about 32 to about 45 pph.

Plasticization can be carried out using either a "wet" process or a "dry" process. The wet process, as the term is used herein, is a process whereby the plasticizer is mixed with a PVB resin aqueous slurry, together with other additives, prior to, or as, the mixture is fed into an extruder. A residence time of from 2 to 24 hours for the plasticizer/PVB mixture can be preferred prior to sending the mixture to an extruder. A wet process suitable for use herein is described in U.S. Pat. No. 3,153,009, for example. A dry process, as the term is used herein, is a process whereby the plasticizer is mixed with the dry PVB resin flake prior to, or as, the mixture is fed into an extruder. A dry process suitable for use herein is described in U.S. Pat. No. 5,886,075, for example.

The $T_g$ of a PVB sheet of the present invention, as measured by Dynamic Mechanical Analysis (DMA) is dependent upon the concentration of plasticizer included in the composition. In the practice of the present invention, a sheet has a $T_g$ of from about 32° C. to about 50° C. Preferably, the $T_g$ is from about 33° C. to about 47° C., and more preferably from about 35° C. to about 45° C.

A low color PVB resin sheet suitable for the purposes herein can be obtained by a process that comprises the steps of: (1) isolating PVB flake from a PVA/butyraldehyde reaction mixture previously described herein; (2) optionally admixing an antioxidant and a UV light stabilizer with the plasticizer to obtain a plasticizer/additive mixture (plasticizer mixture); and (3) co-extruding the flake, plasticizer, antioxidant, and UV light stabilizer, or alternatively co-extruding the flake and the plasticizer mixture at a feed ratio of plasticizer mixture to dry of flake from about 30:100 (wt:wt) to about 50:100 (wt:wt) at a temperature of from about 175° C. to about 225° C. to obtain a low-color PVB resin having a YID of less than about 12. It is preferable to admix the antioxidant/UV light stabilizer with the plasticizer prior to extrusion of the resin.

EXAMPLES

The following Examples and comparative examples are presented to further illustrate the present invention. The Examples are not intended to limit the scope of the invention in any manner, nor should they be used to define the claims or specification in any manner that is inconsistent with the invention as claimed and/or as described herein.

The following tests were used in the examples and comparative examples below.

Hydroxyl number: ASTM D 1396-92.

Sheet yellowness index (YID): A chip is made with 21.0 grams of sheet, and heat pressed into a 10.0 mm thick disk of 50.8 mm diameter. Chip preparation involves preheating a stack of 50.8 mm disks cut from the sheet in a mold for one minute at 2200 N force and 185° C., then increasing the pressing force to 32,000 N at 185° C. for two minutes, and cooling under the same force for 7.5 minutes. No residual surface pattern that was on the extruded sheet is visible in the chip. Yellowness index was determined per ASTM D1925-70 on the 10.0 mm thick chip.

Flake Yellowness Index (YID)

A "chip" specimen is made from 21.0 grams of dried PVB resin (aka flake). Flake moisture should be less than 0.2% prior to chip preparation. The dried flake is heat pressed into a 1-cm thick, 5.08-cm diameter circular chip. Chip preparation involves hot pressing a the 21.0 grams of dried PVB resin as follows:

| Press Cycle | Time (min) | Temp. °C. | Force (N) |
|---|---|---|---|
| a. Pre-heat | 1.5 | 180 | 2220 |
| b. Cure | 2. | 180 | 86700 |
| c. Cool | 8.0 | | 86700 |

The thickness of the chip is measured and recorded and the yellowness index (YID) is then determined per ASTM D1925.

Glass Transition Temperature—$T_g$ is determined by DMA using the procedure of ASTM D4065, using the tangent delta at 1 Hz.

Example 1

Poly(vinyl butyral) sheet was prepared as follows: at 90° C., a mixture comprising 32 parts by weight of poly(vinyl alcohol) of average degree of polymerization 618 and 99.5% hydrolyzed and 68 parts by weight of PVA of average degree of polymerization 1005 and 99.5% hydrolyzed was dissolved in 615 parts by weight of demineralized water. To this solution was added 1 part by weight of 88% para-toluene sulfonic acid and enough sulfuric acid to bring the dissolved PVA solution to a pH of 2. Using the procedure described in U.S. Pat. No. 3,153,009, 62 parts by weight of n-butyraldehyde and 0.47 parts by weight of 70% DOSS and the PVA solution were charged into a vessel maintained at 90° C. After a one hour hold time, a Blurry was obtained and the slurry was stabilized with a sodium hydroxide solution to raise the pH to 11. Concurrent with the stabilization, 0.07 parts by weight Trans® 290 surface tension stabilizing agent was added. The slurry was then washed and cooled with demineralized water. A granular, white PVB resin with residual hydroxyl number of 18.6 and flake YID of 8.8 was obtained. The flake was mixed with 3GO plasticizer containing 4 grams per liter of Tinuvin® P and 8 grams per liter of Lowinox® 44B25 antioxidant and was extruded so that the residence time in the extrusion system was about 15 to 25 minutes. The feed rate ratio of plasticizer to dry flake was 35:100 (wt:wt). Potassium formate solution was injected so as to deliver a potassium concentration of 10 parts per million (ppm) in the sheet. Melt temperature measured at the slot die was between 210 and 215° C. Sheet YID was 5.85.

Comparative Example C1

PVB flake was prepared as in Example 1 except that 0.4 parts by weight of sodium lauryl sulfate was used in the place of DOSS as the surfactant, and no other surface tension modifiers were added. A granular, white PVB resin with residual hydroxyl number of 18.6 was obtained. Using the flake made with sodium lauryl sulfate as described here, sheet was prepared as in Example 1. Melt temperature measured at the slot die was between 210 and 213° C. Sheet yellowness was 25.05.

Comparative Example C2

Flake and sheet were made as in Example C1, except that 4 grams per liter of octylphenol was used in the place of Lowinox® 44 B25 as antioxidant in the plasticizer, and the potassium level was 300 parts per million (ppm). Sheet yellowness index was 13.57.

What is claimed is:

1. A process for preparing a low color, polyvinyl butyral sheet for use in the manufacture of glass laminates comprising the steps:
   (I) admixing polyvinyl alcohol, butyraldehyde, an acid or mixture of acids, water, and sodium dialkyl sulfosuccinate;
   (II) stabilizing the mixture obtained in step (I) by (a) raising the pH of the mixture to at least pH 10, (b) isolating the polyvinyl butyral resin composition by draining the liquid, and (c) washing the polyvinyl butyral resin composition with neutral pH water;
   (III) plasticizing the polyvinyl butyral resin composition with from about 30 to about 50 pph of plasticizer selected from the group consisting of triethylene glycol di(2-ethylhexanoate), tetraethylene glycol diheptanoate, dibutyl sebacate, and mixtures thereof, based on the dry weight of the resin;
   (IV) mixing (a) a polyvinyl butyral bleaching compound selected from the group consisting of organic bisulfites, inorganic bisulfites and sulfosuccinates, and, optionally, (b) an antioxidant and a UV light stabilizer with the polyvinyl butyral resin composition; and
   (V) extruding the polyvinyl butyral resin composition at a temperature of from about 175° C. to about 225° C. to obtain a polyvinyl butyral sheet having a glass transition temperature ($T_g$) of greater than 32° C. and a YID of less than 12.

2. The process of claim 1 wherein the process comprises the mixing with the antioxidant and the UV light stabilizer.

3. A process for preparing a low color, polyvinyl butyral sheet for use in the manufacture of glass laminates comprising the steps:
   (I) admixing polyvinyl alcohol, butyraldehyde, an acid or mixture of acids, water, and sodium dioctyl sulfosuccinate;
   (II) stabilizing the mixture obtained in step (I) by (a) raising the pH of the mixture to at least pH 10, (b) isolating the resin by draining the liquid, and (c) washing the resin with neutral pH water;
   (III) plasticizing the polyvinyl butyral resin composition with from about 30 to about 50 pph of plasticizer, based on the dry weight of the polyvinyl butyral resin, wherein the plasticizer is selected from the group consisting of triethylene glycol di(2-ethylhexanoate), tetraethylene glycol diheptanoate, dibutyl sebacate, and mixtures thereof; and
   (IV) extruding the polyvinyl butyral resin composition at a temperature of from about 175° C. to about 225° C. to obtain a polyvinyl butyral sheet having a glass transition temperature ($T_g$) of greater than 32° C. and a YID of less than 12.

4. The process of claim 3 wherein the polyvinyl butyral is plasticized using a dry process.

5. The process of claim 1 wherein the sodium dioctyl sulfosuccinate is included in amount of from about 0.01 to about 0.85 pph by weight, based on the weight of polyvinyl alcohol.

6. The process of claim 1 wherein the sodium dioctyl sulfosuccinate is included in amount of from about 0.10 to about 0.80 pph by weight, based on the weight of polyvinyl alcohol.

7. The process of claim 2 wherein the bleaching compound is a sodium dialkyl sulfosuccinate.

8. The process of claim 1 wherein the polyvinyl butyral bleaching compound is selected from the group consisting of sodium or potassium bisulfite, and tetramethylammonium bisulfite.

9. The process of claim 1 wherein the polyvinyl butyral bleaching compound is present in an amount of from about 0.01 to about 0.85 parts per hundred, based on the weight of polyvinyl alcohol used in the preparation of the polyvinyl butyral resin composition.

10. The process of claim 1 wherein the polyvinyl butyral bleaching compound is present in an amount of from about 0.10 to about 0.75 parts per hundred, based on the weight of polyvinyl alcohol used in the preparation of the polyvinyl butyral resin composition.

11. The process of claim 1 wherein the plasticizer is triethylene glycol di(2-ethylhexanoate).

12. The process of claim 1 wherein the plasticizer is the triethylene glycol di(2-ethylhexanoate).

13. The process of claim 12 wherein the polyvinyl butyral bleaching compound is selected from the organic bisulfites.

14. The process of claim 12 wherein the polyvinyl butyral bleaching compound is selected from the inorganic bisulfites.

15. The process of claim 12 wherein the polyvinyl butyral bleaching compound is selected from the sulfosuccinates.

16. The process of claim 12 wherein the polyvinyl butyral bleaching compound is sodium dialkyl sulfosuccinate.

17. The process of claim 12 wherein the bleaching compound is sodium dioctyl sulfosuccinate.

18. The process of claim 1 wherein the plasticizer is the tetraethylene glycol diheptanoate.

19. The process of claim 1 wherein the plasticizer is the dibutyl sebacate.

20. The process of claim 1 further comprising laminating the polyvinyl butyral sheet to glass.

21. The process of claim 5 further comprising laminating the polyvinyl butyral sheet to glass.

22. The process of claim 8 further comprising laminating the polyvinyl butyral sheet to glass.

23. The process of claim 1 further comprising forming a windshield by laminating the polyvinyl butyral sheet to glass.

24. The process of claim 1 further comprising forming a glass laminate for use in a home or other building.

25. The process of claim 3 wherein the polyvinyl butyral is plasticized using a wet process.

26. The process of claim 3 wherein the sodium dioctyl sulfosuccinate is included in amount of from about 0.01 to about 0.85 pph by weight, based on the weight of polyvinyl alcohol.

27. The process of claim 3 wherein the sodium dioctyl sulfosuccinate is included in amount of from about 0.10 to about 0.80 pph by weight, based on the weight of polyvinyl alcohol.

28. The process of claim 3 further comprising mixing an antioxidant and a UV light stabilizer with the polyvinyl butyral resin composition after the plasticizing and prior to the extruding.

29. The process of claim 28 wherein the antioxidant is included in an amount of from about 0.01 to about 0.6%, based on the total weight of the sheet.

30. The process of claim 29 wherein the antioxidant is a bis-phenolic antioxidant.

31. The process of claim 29 wherein the antioxidant is present in amount of from about 0.03 to about 0.3%, based on the total weight of the sheet.

32. The process of claim 31 wherein the antioxidant is a bis-phenolic antioxidant selected from the group consisting of 2,2'-ethylidenebis(4,6-di-t-butylphenol); 4,4'-butylidenebis(2-t-butyl-5-methylphenol); 2,2'-isobutylidenebis(4,6-dimethylphenol); and 2,2'-methylenebis(6-t-butyl-4-methylphenol).

33. The process of claim 3 wherein the YID is less than 8.

34. The process of claim 31 wherein the plasticizer is triethylene glycol di(2-ethylhexanoate).

35. The process of claim 3 wherein the plasticizer is triethylene glycol di(2-ethylhexanoate).

36. The process of claim 27 wherein the plasticizer is triethylene glycol di(2-ethylhexanoate) and is present in an amount of from about 30 to about 45 pph, by weight, based on the dry weight of the polyvinyl butyral resin.

37. The process of claim 36 further comprising the mixing the antioxidant and the UV light stabilizer with the polyvinyl butyral resin composition, wherein the antioxidant is included in an amount of from about 0.01 to about 0.6%, based on the total weight of the sheet, and wherein the antioxidant is a bis-phenolic antioxidant.

38. The process of claim 25 wherein the admixing is carried out at a temperature of 5 to 100° C.

39. The process of claim 36 wherein the admixing is carried out at a temperature of about 90° C.

40. The process of claim 31 further comprising laminating the polyvinyl butyral sheet to glass.

41. The process of claim 3 further comprising laminating the polyvinyl butyral sheet to glass.

42. The process of claim 26 further comprising laminating the polyvinyl butyral sheet to glass.

43. The process of claim 3 further comprising forming a windshield by laminating the polyvinyl butyral sheet to glass.

44. The process of claim 3 further comprising forming a glass laminate for use in a home or other building.

45. A process for preparing a low color, polyvinyl butyral sheet for use in the manufacture of glass laminates comprising the steps:
(I) admixing polyvinyl alcohol, butyraldehyde, an acid or mixture of acids, water, and sodium dialkyl sulfosuccinate;
(II) stabilizing the mixture obtained in step (I) by (a) raising the pH of the mixture to at least pH 10, (b) isolating the resin by draining the liquid, and (c) washing the resin with neutral pH water;
(III) plasticizing the polyvinyl butyral resin composition with from about 30 to about 50 pph of plasticizer selected from the group consisting of diesters obtained by (a) the reaction of triethylene glycol or tetraethylene glycol with aliphatic carboxylic acids having from 6 to 10 carbon atoms and (b) the reaction of sebacic acid with aliphatic alcohols having from 1 to 18 carbon atoms, and mixtures thereof, based on the dry weight of the polyvinyl butyral resin; and
(IV) extruding the polyvinyl butyral resin composition at a temperature of from about 175° C. to about 225° C. to obtain a polyvinyl butyral sheet having a glass transition temperature ($T_g$) of greater than 32° C. and a YID of less than 12.

46. The process of claim 45 wherein the plasticizer is selected from the group consisting of the diesters obtained by the reaction of triethylene glycol or tetraethylene glycol with aliphatic carboxylic acids having from 6 to 10 carbon atoms.

47. The process of claim 45 further comprising laminating the polyvinyl butyral sheet to glass.

48. The process of claim 45 further comprising forming a windshield by laminating the polyvinyl butyral sheet to glass.

49. The process of claim 45 further comprising forming a glass laminate for use in a home or other building.

* * * * *